May 5, 1959 R. A. WILLIAMS ET AL 2,885,609

SEMICONDUCTIVE DEVICE AND METHOD FOR THE FABRICATION THEREOF

Filed Jan. 31, 1955

INVENTORS
RICHARD A. WILLIAMS
JOHN W. TILEY
BY
Allen V. Hazeltine
ATTORNEY

United States Patent Office 2,885,609

Patented May 5, 1959

2,885,609

SEMICONDUCTIVE DEVICE AND METHOD FOR THE FABRICATION THEREOF

Richard A. Williams, Collingswood, N.J., and John W. Tiley, Hatboro, Pa., assignors to Philco Corporation, Philadelphia, Pa., a corporation of Pennsylvania Application January 31, 1955, Serial No. 485,263

7 Claims. (Cl. 317—235)

This invention relates to semiconductive devices and to fabrication methods therefor, and more specifically to a novel transistor and transistor-manufacturing process. This application is a continuation-in-part of our copending application Serial No. 395,823 for an "Electrical Device," filed December 2, 1953, now abandoned.

In the past, pairs of opposing, relatively closely spaced junctions in semiconductive bodies have been utilized as active elements in semiconductive devices. For example, in the junction transistor a pair of such opposing junctions is utilized, one junction ordinarily serving as an emitter of minority-carriers and the other as a collector for these carriers. In general, the closer and more nearly parallel are these junctions, the better is the high frequency response of the device, so long as the junctions do not approach each other so closely as to short together or break down upon the application of operating voltages. Similarly, in the so-called analogue transistor it has become common to employ a pair of closely-spaced, opposing junctions in a semiconductive body, so arranged that current is constrained to flow transversely through the region between the junctions, and the magnitudes of the reverse biases applied to the junctions control the magnitude of the current flow therebetween. The latter pair of junctions together comprise what is commonly termed the "gate" element of the analogue transistor, and the closer together are these junctions, without touching, the greater is the control sensitivity of the device.

However, there are several inherent practical disadvantages to the arrangement of opposing junctions described above. One of these relates to the difficulty of forming the junctions so as to be closely-spaced and substantially parallel, as is desired in many applications, without having them touch or "short" together. The available methods for the creation of junctions, such as their formation during the growing of crystals or their production by the alloying of metals into semiconductors, are difficult to control so as to obtain such highly-desirable geometries. For example, the opposing junctions commonly provided by alloying techniques are inherently convex-inwards, so as to be non-parallel, and often differ widely in their spacings in different units because of fabrication difficulties. Another inherent limitation of the alloy device and technique becomes apparent when the junctions are to be spaced as closely together as possible. This alloy process involves the production of contiguous molten regions in the semiconductor, extending substantially completely through the body, which must approach each other even more closely than the spacing of the junctions to be produced after cooling and solidification. The mechanical problems thus occasioned are especially noticeable in the case of the analogue transistor, in which the junctions ordinarily are of such lateral geometry as to extend entirely across the semiconductive body, or to circumscribe a predetermined region thereof; in order to obtain junctions which are closely spaced, the regions of molten alloy must penetrate substantially completely through the semiconductive body, whereby the support for the semiconductive material is greatly reduced. The result is a high degree of breakage, or at least undesired distortion, of the semiconductive body unless, and sometimes even when, elaborate precautions are taken.

Accordingly, it is an object of the invention to provide a new and improved transistor structure.

Another object is to provide a new type of transistor having improved mechanical properties and susceptible of fabrication with improved accuracy.

A further object is to provide a new type of transistor having superior high frequency performance and gain.

A further object is to provide a new and improved form of analogue transistor, and methods for its fabrication.

It is also an object of our invention to provide a new and improved method for fabricating semiconductive amplifying structures.

It is still another object to provide a method of fabricating semiconductive amplifiers which is capable of superior control, so as to produce more accurate geometries.

In accordance with the invention, the above objectives are achieved by employing a body of semiconductive material having a junction therein suitable for service as an active element of a transistor, as for the emitter or collector of a bipolar transistor, or for a portion of the gate structure of a monopolar or analogue transistor. A surface of the semiconductive body is provided, which closely confronts the junction formed therein and is preferably substantially parallel to the junction over a substantial area. A rectifying area-contact in the form of a metal in smooth, substantially stressless, intimate engagement with the surface confronting the junction is then provided. The junction and the area-contact may then be utilized as the gate elements of an analogue transistor, or alternatively the two elements may be utilized as the emitter and collector elements of a bipolar transistor.

With this construction, the area-contact may be spaced extremely accurately with respect to the junction and may be made substantially plane-parallel therewith, so as to obtain reproducibly transistors which are not only operative with excellent gain but which are also suitable for high frequency use, particularly in the case of the bipolar type. Furthermore, and particularly with regard to the analogue type produced by alloying techniques, since the junction is formed before the semiconductive material is reduced to its final thickness, the molten region of the body produced during the alloying step never approaches so closely to the opposite surface of the body as to reduce appreciably the structural strength thereof, or to produce any marked tendency toward sagging or breaking of the body.

Other objects and features of the invention will become apparent from a consideration of the following detailed description, taken in connection with the accompanying drawings, in which.

Figure 1A:
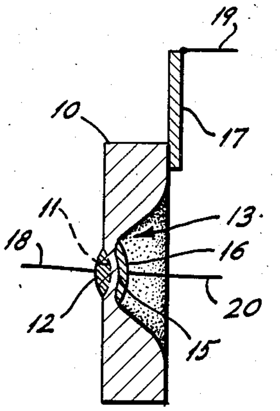
Figures 1A and 1B are enlarged sectional and elevational views, respectively, of a bipolar transistor constructed in accordance with the invention.
Figure 1B:
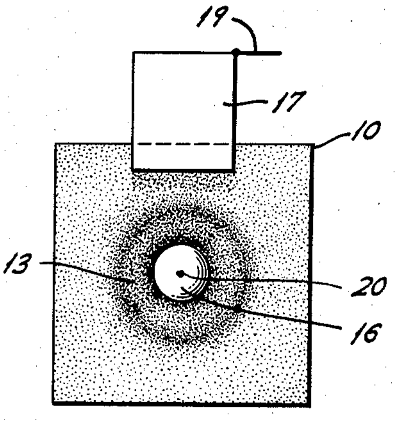

Referring now to Figures 1A and 1B in detail, wherein it will be understood that the drawings are for the purpose of illustration only and not necessarily to scale, the novel bipolar transistor there shown comprises a body of semiconductive material 10 having therein a junction 11, typically formed by alloying into body 10 a suitable metal 12. The junction 11 may comprise a P–N junction of usual form, the metal 12 being chosen from the group comprising metallic activators of the type opposite to those in excess in body 10. As an example, body 10 may comprise single-crystalline, N-type germanium having a resistivity of the order of 1 ohm-centimeter and a hole-lifetime of the order of 10 or more microseconds, while metal 12 may comprise indium. However, it will be understood that other semiconductors and metals may also be used.

The junction 11 is closely spaced from the opposite surface of the body 10, and in the present example this is accomplished by providing a depression 13 in body 10, the bottom of which is closely spaced from junction 11 and conforms generally to the convex boundary of the junction. Upon this closely-spaced, opposing surface of body 10 there is provided a metal-to-semiconductor area-contact 15 between a body of suitable metal 16 and the semiconductive surface. Also provided are a base tab 17, suitably soldered to base 10 to provide a substantially ohmic connection, and leads 18, 19 and 20 making connection to the body of metal 12, the base tab 17 and the metal body 16, respectively.

Figure 2A:
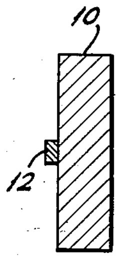
Figures 2A to 2C are enlarged sectional views of a semiconductive structure in accordance with the invention, shown in various stages of fabrication, and to which particular reference will be made in describing our novel method of manufacture.
Figure 2B:
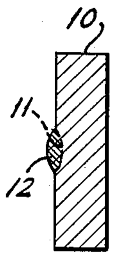
Figure 2C:
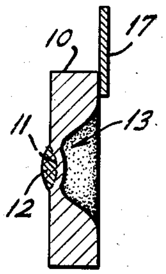

In the preferred method for fabricating the structure of Figure 1A, the junction 11 is first formed by generally conventional techniques. Thus a suitable impurity metal 12 in the form of a disc may be applied to one surface of body 10, as shown in Figure 2A. The metal 12 is held in position, by any one of a number of jigging techniques well known in the art, while the assembly is heated to alloy the metal into body 10. The resultant structure after cooling is as shown in Figure 2B, wherein the metal has been alloyed into body 10 to provide the junction 11 along the dotted line shown. Next the base tab 17 may be soldered to a portion of body 10 remote from junction 11 and from the opposing surface of body 10, and the semiconductive material directly opposite the junction may be etched away to provide the structure shown in Figure 2C.

Preferably this etching-away is accomplished by means of the jet-electrolytic etching technique described in detail in our copending application Serial No. 472,824 of J. W. Tiley and R. A. Williams entitled "Semiconductive Devices and Methods for the Fabrication Thereof" and filed December 3, 1954, in accordance with which a jet of an electrolytic etchant for the semiconductive material is applied against the surface of the material, while a suitable potential source maintains the body 10 positive with respect to the electrolytic jet. To cause the bottom of the depression to conform more closely with the curved surface of the junction 11, we prefer to make use of the bias-control of electrolytic etching described in detail in the copending application Serial No. 418,887 of William E. Bradley, entitled "Electrical Method and Device" and filed March 26, 1954, now Patent No. 2,846,346, in accordance with which a reverse bias is applied to the junction 11 with respect to the base 10 during electrolytic etching, so that the etching action slows down as the etched surface approaches junction 11. However, this is not essential even to this embodiment of the invention, since the desired convex-inward surface configuration may be obtained, for example, by utilizing a fine jet and rotating the semiconductor about an axis slightly displaced from the center of the jet during the etching process. Since such processes are described in detail in the abovementioned copending applications, it will not be necessary to repeat herein the details of considerations relevant thereto.

To provide the completed structure shown in Figures 1A and 1B, the metal body 16 is next applied to the bottom of the depression 13 directly opposite the junction 11, and contacting leads may be spring-tensioned or quick-soldered to metal bodies 12 and 16. In applying metal 16, the jet-electrolytic plating method described in our above-cited copending application Serial No. 472,-824 may suitably be employed.

Figure 3:
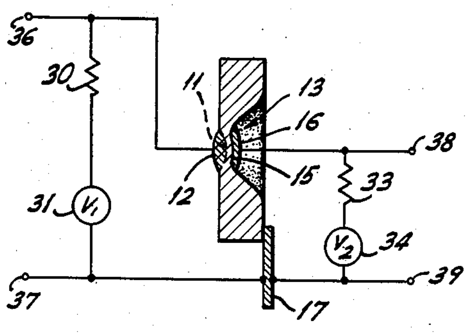
Figure 3 is a representation, partly sectional and partly schematic, showing an amplifying stage utilizing our novel amplifying element as the active element thereof.

The resultant transistor structure is shown connected in a simple electrical circuit in Figure 3, wherein there are provided an input load resistor 30 and a biasing source 31 between the metal 12 and the base contact 17, and a corresponding output resistor 33 and biasing source 34 between the metal contact 16 and base contact 17. In ordinary usage, the source 31 will be such as to bias the junction 11 in the forward direction so as to produce emission of minority-carriers into body 10, while source 34 will bias the area-contact 15 in the reverse direction to produce a collector for the emitted minority-carriers. Variations in the input voltage at terminals 36 and 37 will then produce corresponding, amplified voltage variations at output terminals 38 and 39 even for very high signal frequencies, due in large measure to the small, uniform spacing of the collector contact from the emitter junction obtained with our novel structure.

Figure 4B:
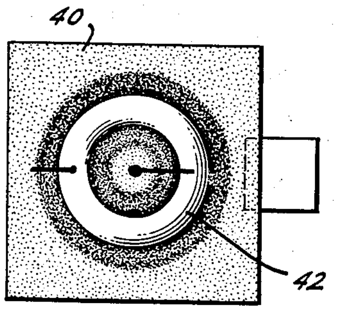
Figures 4A and 4B are sectional and plan views, respectively and to different scales, of a monopolar or analogue transistor constructed in accordance with the invention.
Figure 4A:
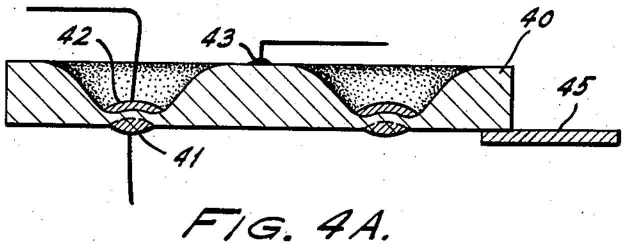

In Figures 4A and 4B there is shown a structure in which the invention is embodied in an analogue transistor of the ring type disclosed generally in our copending application Serial No. 472,824. In this embodiment, the transistor consists of the semiconductive body 40 having a pair of rings on directly opposing surfaces thereof, one of the rings comprising a junction and the other comprising an area-contact. The nature of these rings may be similar to the junction and area-contact employed in the embodiment of Figures 1A and 1B, except for the change in geometry necessary to produce the ring-like lateral configuration. To produce the ring junction 41, a suitable metal for forming a junction in the semiconductive body 40 may be applied to the surface of the body in the form of a ring and heated sufficiently to alloy the metal into the semiconductor to form the desired junction. A ring of corresponding lateral geometry may then be etched into the opposite surface of the semiconductive body 40, as by means of the jet-etching techniques referred to hereinbefore, and the ring of metal 42 applied to the bottom of this depression by jet-plating. Another metallic deposit or contact 43 preferably provides substantially ohmic connection to a surface region within the ring, and an ohmic base connection 45 is affixed as by soldering to a region on the surface of body 40 outside of the rings, as shown.

Potentials applied between the central contact 43 and the exterior contact 45 then tend to produce currents which must flow between the junction ring 41 and the area-contact ring 42. By varying the reverse bias on rings 41 and 42, the depletion regions associated therewith may be caused to vary in respect of the extent to which they intrude into the semiconductive body, thereby to vary the magnitude of the current permitted to flow therebetween. The mechanism by which gain is obtained in transistors of the analogue type is well known and need not be described here, except to point out that the configuration shown permits a high degree of control of the current and therefore excellent gain.

In connection with the embodiment of Figures 4A and 4B, it will be observed that, if both rings 41 and 42 were junctions simultaneously made by the usual alloyed-junction techniques, in order to form the two junctions as close together as possible the two opposing ring-shaped regions produced during the alloying process would of necessity approach each other very closely, or even touch. The semiconductive material included within the rings would then be without substantial support, and would readily break away from the surrounding material, or at least be deformed or stressed undesirably, even though elaborate precautions in handling were taken to prevent it.

Our semiconductive structure which employs a junction in a semiconductive body and an area-contact closely confronting the junction on the directly-opposing surface of the body therefore provides improvements in geometry, resulting in improved electrical performance, and significant improvements in ease of fabrication and reproducibility.

Although the invention has been described with particular reference to specific-embodiments thereof, it will be understood that it is susceptible of embodiment in a large number of forms still within the scope of the invention. For example, the junction employed need not be made by the alloying process, but may be "grown" in the semiconductive body by well known techniques well known to those skilled in the art.

We claim:

1. A semiconductive device comprising a body of semiconductive material, a broad-area rectifying junction within said body, and means including a rectifying area-contact to a surface of said body for providing a collecting field closely confronting said broad-area of said junction.

2. A semiconductive device comprising a body of semiconductive material, a broad-area junction within said body and having a non-planar configuration, a layer of said semiconductive material of substantially uniform thickness overlying said broad-area junction, and a rectifying metal-to-semiconductor area-contact overlying said layer and covering the area of said layer opposite said junction.

3. The device of claim 3, in which said junction is generally convex in the direction of said contact, and said contact is generally concave in the direction of said junction.

4. An analogue transistor structure comprising a body of semiconductive material, a ring-shaped junction in said body, a ring-shaped rectifying area-contact to a surface of said body confronting said junction, and a pair of additional connections to said body, one of said connections being located within one of said ring-shaped elements and the other of said connections being located outside of both of said ring-shaped elements.

5. The method of fabricating a semiconductive device comprising the steps of forming a broad-area junction within said body, removing material from said body in a region confronting said junction until a layer of said material of substantially uniform, small thickness remains adjacent said junction, and forming a rectifying area-contact on the surface region of said layer closely confronting said junction.

6. The method of claim 5, in which said step of removing said material comprises electrolytic etching while applying a reverse bias to said junction.

7. A transistor comprising a base element consisting of a body of semiconductive material, an emitter element consisting of a rectifying-junction connection formed in one surface of said body, and a collector element consisting of a rectifying metal-to-semiconductor area-contact to a surface of said body opposite said one surface, said area-contact being at least as large in area as the confronting surface of said rectifying-junction connection.

References Cited in the file of this patent

UNITED STATES PATENTS

| | | |
|---|---|---|
| 2,563,503 | Wallace | Aug. 7, 1951 |
| 2,655,608 | Valdes | Oct. 13, 1953 |
| 2,657,360 | Wallace | Oct. 27, 1953 |
| 2,666,814 | Shockley | Jan. 19, 1954 |
| 2,672,528 | Shockley | Mar. 16, 1954 |
| 2,694,168 | North | Nov. 9, 1954 |
| 2,725,315 | Fuller | Nov. 29, 1955 |
| 2,792,539 | Lehovec | May 14, 1957 |
| 2,795,742 | Pfann | June 11, 1957 |

UNITED STATES PATENT OFFICE

CERTIFICATE OF CORRECTION

Patent No. 2,885,609

May 5, 195

Richard A. Williams et al.

It is hereby certified that error appears in the printed specificatio of the above numbered patent requiring correction and that the said Letter Patent should read as corrected below.

Column 5, line 31, for the claim reference numeral "3" read -- 2 --.

Signed and sealed this 31st day of January 1961.

(SEAL)
Attest:

KARL H. AXLINE
Attesting Officer

ROBERT C. WATSON
Commissioner of Patents